United States Patent [19]

Su

[11] Patent Number: 5,978,549
[45] Date of Patent: Nov. 2, 1999

[54] METHOD FOR PROCESSING HEATING WIRE OF AQUARIUM HEATER AND AQUARIUM HEATER MADE BY THE METHOD

[76] Inventor: Wen-Hong Su, No. 85, Ching-Ann St., Tue-Cheng-City, Taipei Hsien, Taiwan

[21] Appl. No.: 09/106,000

[22] Filed: Jun. 29, 1998

[51] Int. Cl.⁶ ..................................................... H05B 3/40
[52] U.S. Cl. .......................................... 392/497; 392/503
[58] Field of Search .................................. 338/262–266, 338/267, 270, 282, 286, 296, 302; 392/497, 503; 219/481

[56] References Cited

U.S. PATENT DOCUMENTS

| | | | |
|---|---|---|---|
| 1,281,218 | 10/1918 | Schwartz | 338/207 |
| 2,150,404 | 3/1939 | Schafer | 174/87 |
| 2,597,226 | 5/1952 | Coates | 338/262 |
| 2,941,176 | 6/1960 | Jacoby | 338/262 |
| 3,492,624 | 1/1970 | Oakley | 338/296 |
| 4,135,179 | 1/1979 | Snyder | 338/28 |
| 5,676,872 | 10/1997 | Garcia-Rodriguez | 219/549 |

*Primary Examiner*—Tu Ba Hoang
*Assistant Examiner*—Thor Campbell
*Attorney, Agent, or Firm*—Dougherty & Troxell

[57] ABSTRACT

A method for processing heating wire of aquarium heater and an aquarium heater made by the method. The method includes a step of prior to sealing the heating wire, coating the heating wire with a thin insulative voltage-resistant and heat-resistant layer, whereby even though the outer protective skin of the heater is broken and water infiltrates therethrough, the insulative layer can still effectively avoid leakage of electricity and ensure safety. The aquarium heater includes: a heating wire wound on a heat-resistant insulative medium, the heating wire being processed and coated with an insulative layer of vaseline prior to sealing; a conductive metal wire connected to two ends of the heating wire; and an outer insulative protective skin coated on the heating wire and the conductive wire. The heating wire is electrically connected with the metal wire without using any terminal and the outer protective skin is integrally coated on surfaces of the heating wire, conductive metal wire and the adjoining section therebetween.

12 Claims, 6 Drawing Sheets

METHOD FOR PROCESSING HEATING WIRE OF AQUARIUM HEATER AND AQUARIUM HEATER MADE BY THE METHOD

BACKGROUND OF THE INVENTION

The present invention relates to a method for processing heating wire of aquarium heater and an aquarium heater made by the method. Prior to sealing, the heating wire is previously coated with a thin insulative voltage-resistant and heat-resistant layer, whereby even though the outer protective skin of the heater is broken and water infiltrates therethrough, the insulative layer can still effectively avoid leakage of electricity.

It is known that infiltration of water and leakage of electricity often take place in the conventional aquarium heater. In manufacturing, in order to avoid leakage of electricity, the heater is watertightly wrapped by multiple layers of insulative skins. In a conventional single-tube type aquarium heater, the adjoining section between the heating wire and the metal conductive wire is possibly placed in the tube which is sealed by multiple watertight layers. FIG. 8 shows an elongated wire-shaped heater which is coated by multiple insulative skins to achieve a waterproof and insulative effect. FIG. 7 shows a manufacturing method for such heater, in which the heating wire sealed in the heater does not go through any insulative and waterproof processing prior to sealing. After connected with the metal conductive wire, the heating wire is directly placed into the tube or coated by the outer protective skin. Therefore, once the outer waterproof skin is damaged, water infiltration and leakage of electricity will take place.

As shown in FIG. 8, in the elongated wire-shaped heater, the heating wire is wound on a soft heat-resistant insulative wire material (such as fiber glass). Then the heating wire is electrically connected with the conductive wire via a terminal. Then the wires are coated with a protective silicone layer as an insulative skin. In coating procedure, the terminal is first wrapped by an inner high temperature-resistant silicone layer and then further coated with an outer silicone layer Accordingly, a bulge knot will be formed at the terminal. After a long period of use, the knot will suffer bending force and thermal expansion and contraction. Therefore, the protective skin tends to break. This leads to danger of infiltration of water and leakage of electricity. As a result, in use, the knot is prevented from being immerged in water so as to ensure safety.

In addition, in manufacturing, the heating wire and conductive wire must be connected with the terminals one by one and must be wrapped by two insulative layers. This is time-consuming and will increase manufacturing cost.

SUMMARY OF THE INVENTION

It is a primary object of the present invention to provide a method for processing heating wire of aquarium heater. The aquarium heater made by the above method is able to bear high voltage and high temperature and avoid infiltration of water and leakage of electricity so as to ensure safety.

It is a further object of the present invention to provide an aquarium heater made by the above method, which is manufactured at low cost and is assembled without using any terminal.

It is still a further object of the present invention to provide the above aquarium heater which can have different forms for different applications.

According to the above objects, the method for processing heating wire of aquarium heater of the present invention includes a step of prior to sealing of the heating wire, coating the heating wire with a thin insulative voltage-resistant and heat-resistant layer, whereby even though the outer protective skin of the heater is broken and water infiltrates therethrough, the insulative layer can still effectively avoid leakage of electricity.

The aquarium heater of the present invention includes: a heating wire wound on a heat-resistant insulative medium, the heating wire being processed and coated with an insulative layer of petroleum jelly, such as vaseline prior to sealing; a conductive metal wire connected to two ends of the heating wire; and an insulative protective skin coated on the heating wire and the conductive wire as an outermost insulative layer. The heating wire is electrically connected with the metal wire without using any terminal and the outer protective skin is integrally coated on surfaces of the heating wire, conductive metal wire and the adjoining section therebetween.

The present invention can be best understood through the following description and accompanying drawings, wherein:

DETAILED DESCRIPTION OF THE PREFERRED EMBODIMENTS

Figure 1:
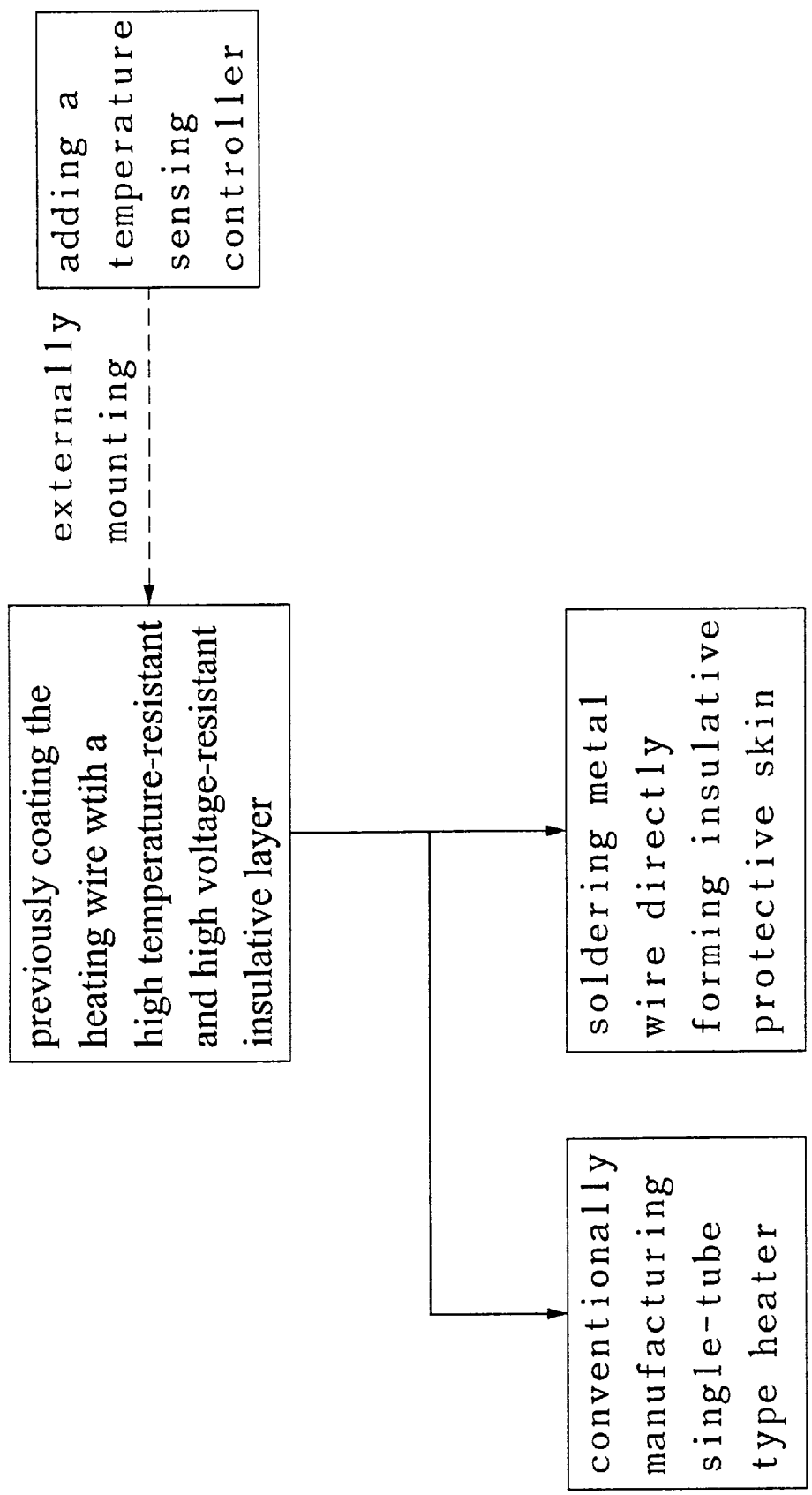
FIG. 1 is a block diagram of the flow chart of the processing method of the present invention.
Figure 2:
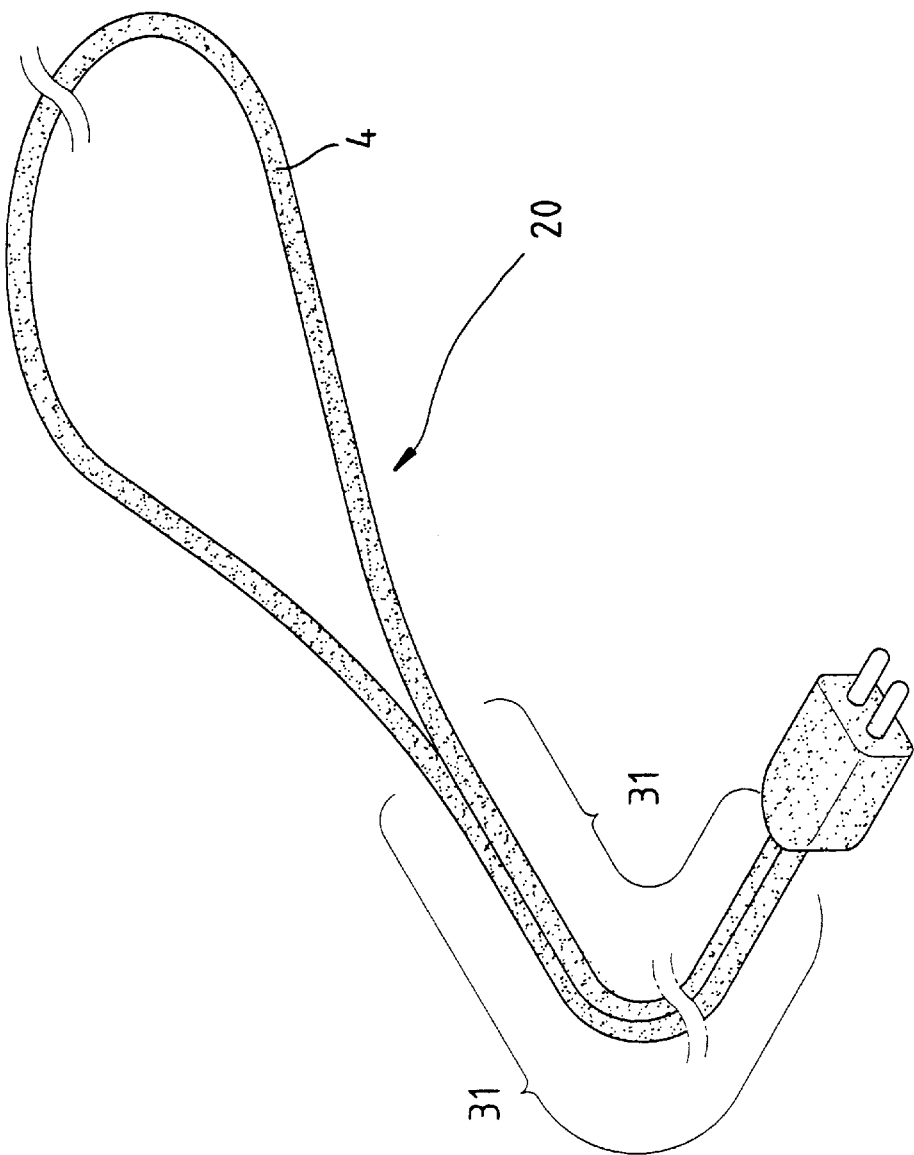
FIG. 2 is a perspective view of the heater made by the method of the present invention.

Please refer to FIGS. 1 and 2 which show the processing method of the present invention. Prior to sealing of the heating wire 1, the heating wire 1 is first coated with a thin insulative voltage-resistant and heat-resistant layer 13. Then the heating wire 1 is added with a temperature sensing controller. Then the wire is coated with an outer layer or placed into the heating tube and watertightly sealed. Accordingly, even though the protective outer skin 4 of the heater 10 is broken and water infiltrates therethrough, the insulative coating 13 can still effectively avoid leakage of electricity and ensure safety.

The insulative layer 13 of the above method preferably is able to bear at least 3.5 kilovolts. The insulative layer 13 can be made of petroleum jelly or other similar sticky materials which are difficult to remove. The heating wire 1 can be immersed therein to form a thin insulative coating on the surface, whereby the heating wire 1 can bear 120° C. and 3.5 kilovolts without leakage of electricity.

Figure 3:
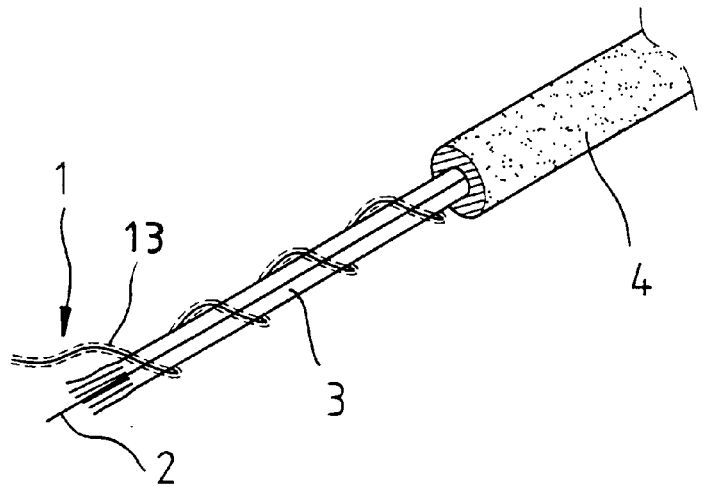
FIG. 3 is a sectional view of the heater of the present invention, showing the heating wire and conductive wire thereof.
Figure 4:
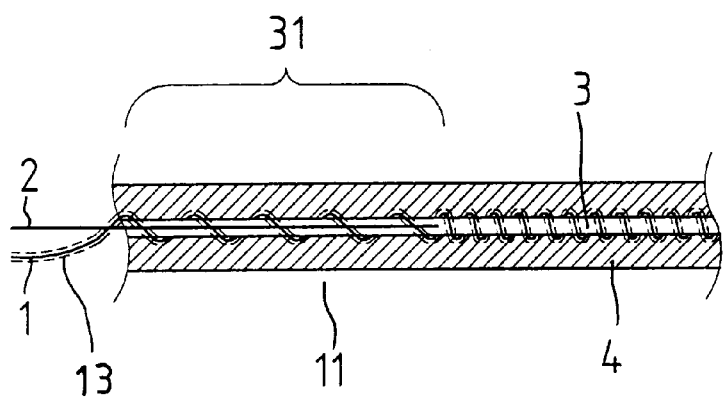
FIG. 4 is a sectional view according to FIG. 3.

FIGS. 2, 3 and 4 show the heater manufactured by the above method. The heater 20 includes: a heating wire 1 wound on a heat-resistant insulative medium 3, the heating wire 1 being processed and coated with an insulative layer 13 of petroleum jelly; a conductive metal wire 2 connected to two ends 11 of the heating wire 1; and an insulative protective skin 4 coated on the heating wire 1 and the conductive wire 2 as an outermost insulative layer.

The metal wire 2 is preferably a copper wire or a tin-plated copper wire. The insulative medium 3 is fiber glass wire. In order to facilitate winding and achieve good electrical connection, the insulative medium 3 has an elongated profile and the metal wire 2 and the heating wire 1 are both located in an extension section 31 of the insulative medium 3'. In winding, the metal wire 2 is first parallelly attached to the insulative medium 3 and then the heating wire 1 is wound thereon to tie up the metal wire 2 and the insulative medium 3 so as to achieve a good continuous electrical connection.

According to the above arrangement, the heater of the present invention has three advantages as follows:

1. The heating wire 1 is electrically connected with the metal wire 2 without using any terminal. Therefore, the assembling procedure is simplified and the cost is reduced. The heating wire 1 and the metal wire 2 contact with each other through a certain length to achieve good electrical connection without impedance which will generate heat. Accordingly, the protective skin 4 is protected from damage due to thermal expansion and contraction.

2. The surfaces of the heating wire 1, conductive metal wire 2 and the adjoining section therebetween have unified dimension so that the one single layer of outer protective skin 4 can be integrally coated on the surfaces. Therefore, the adjoining section between two ends 11 of the heating wire 1 and the conductive metal wire 2 will not form a bulge knot as the conventional heater. Accordingly, the problems of infiltration of water and leakage of electricity due to bending and damage of the knot after a period of use are eliminated.

3. The heating wire 1 immersed in the water is protected by double insulative protective layers. Therefore, even though the outer protective skin 4 is bitten off by a fish, the inner insulative layer 13 can still prevent leakage of electricity so as to ensure safety in use.

In addition, the material and length of the heating wire 1 can be varied to form different heaters 20 with different specifications of 24 V or 115 V to 230 V. After powered on, the temperature of the surface of the heater 20 is controlled to be about 62° C. Even though the protective skins 4 collide each other, no over-heating will take place. In application, it is unnecessary to support and fix the heater with a rack and the heater can be freely placed into an aquarium and laid on the bottom thereof. The outer protective skin 4 is made of soft insulative plastic material, whereby the heater can be made in the form of an elongated wire and totally immersed in the water all over the bottom and the corners of the aquarium so as to provide evenly heating effect. Moreover, the adjoining section of the heater can be entirely immersed in the water. In contrast, in the conventional heater, the knot must be lifted and positioned above the water level so as to ensure safety.

Figure 5:
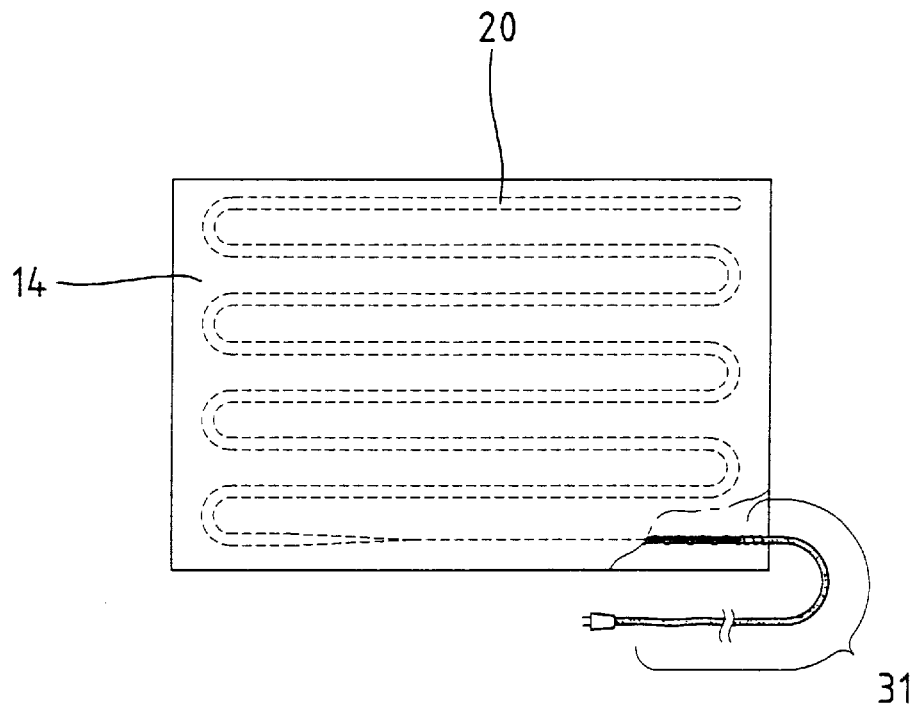
FIG. 5 shows another embodiment of the heater of the present invention.
Figure 6:
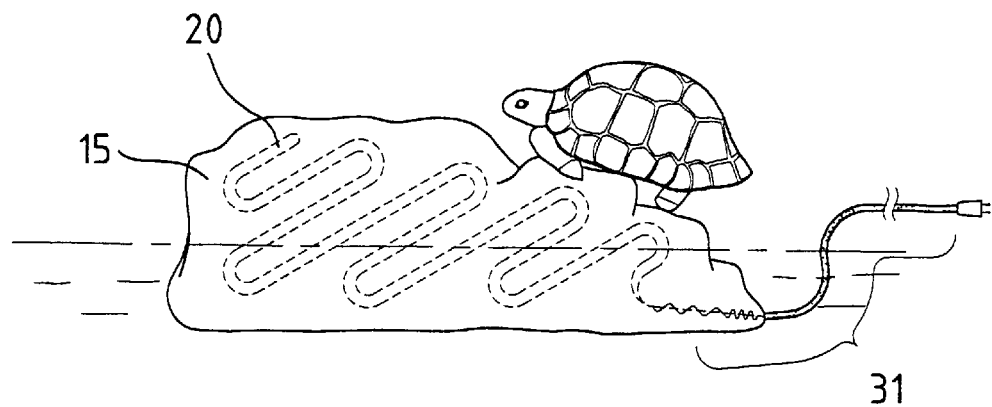
FIG. 6 shows still another embodiment of the heater of the present invention.
Figure 7:
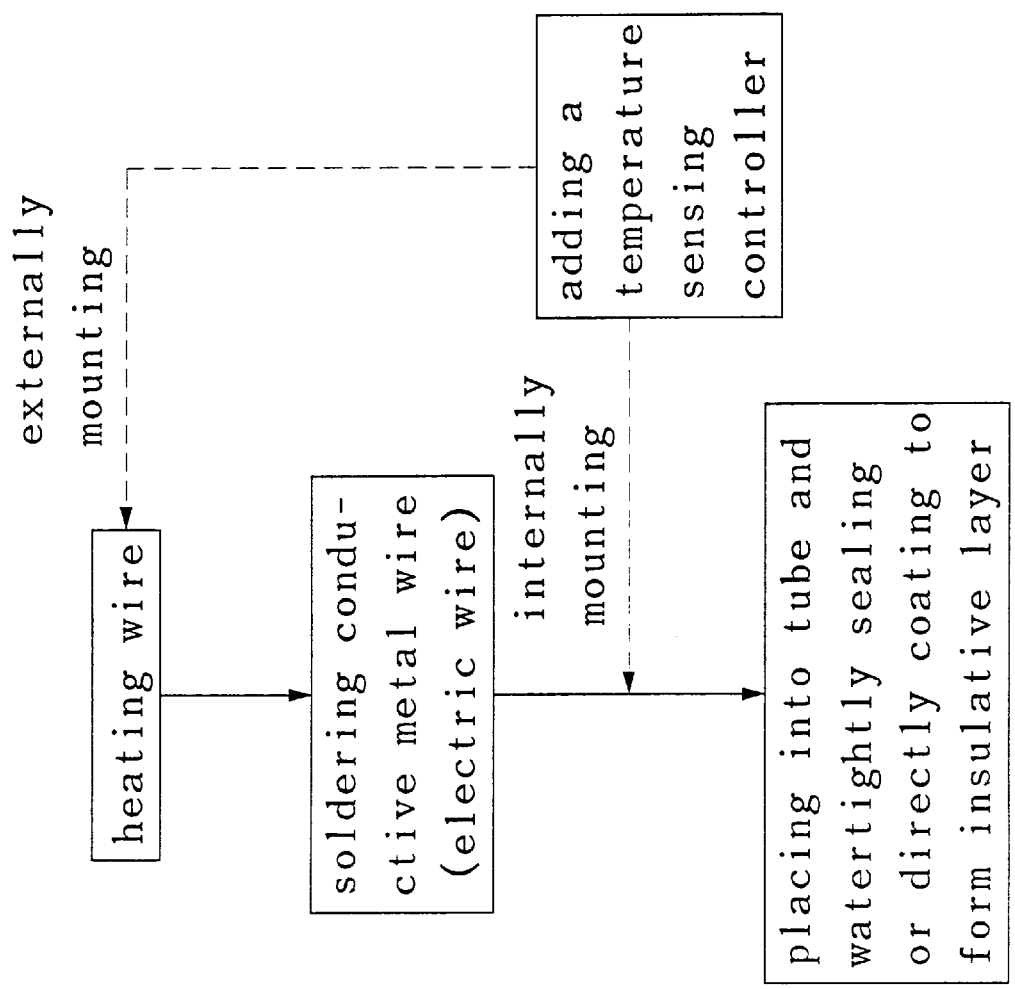
FIG. 7 is a block diagram of the flow chart of the manufacturing method of the conventional aquarium heater.
Figure 8:
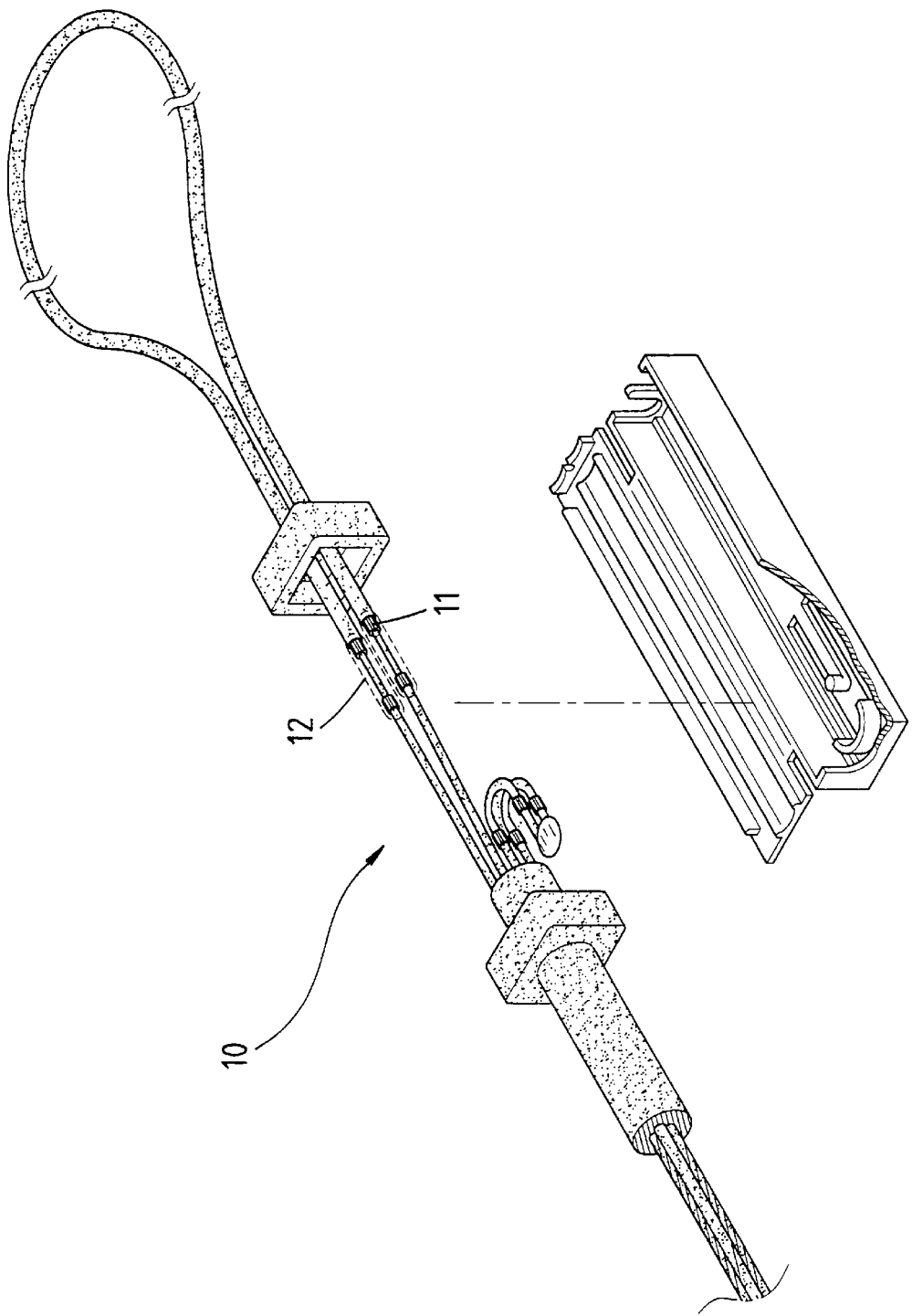
FIG. 8 is a perspective exploded view of the conventional elongated wire-shaped aquarium heater.

FIGS. 5 and 6 show different aspects of the heaters 20. In FIG. 5, the outer layer 14 of the heater is made of a plastic sheet as a tile. In application, the entire heater can be attached to one side of the aquarium or the bottom thereof Alternatively, the outer protective skin 15 can be made of concrete as a hard irregularly shaped heated rock (as shown in FIG. 6), whereby a reptile pet can crouch on the rock for expediting excrement of the pet.

It should be noted that the above description and accompanying drawings are only used to illustrate some embodiments of the present invention, not intended to limit the scope thereof Any modification of the embodiments should fall within the scope of the present invention.

What is claimed is:

1. A method for processing a heating wire of an aquarium heater, comprising the steps of: prior to sealing of the heating wire, coating the heating wire with a thin insulative voltage-resistant and heat-resistant layer of petroleum jelly; and coating the wire with an outer protective skin, whereby even though the outer protective skin is broken and water infiltrates therethrough, the insulative layer can still effectively avoid leakage of electricity and ensure safety.

2. The method as claimed in claim 1, wherein the insulative layer of petroleum jelly enables the heating wire to beat at least 120° C. and 3.5 kilovolts.

3. The method as claimed in claim 1, wherein the insulative layer of petroleum jelly is formed by the step of immersing the heating wire in the petroleum jelly.

4. An aquarium heater comprising:

a heating wire wound on heat-resistant insulative medium, the heating wire being processed and coated with an insulative layer of petroleum jelly prior to sealing;

a conductive metal wire connected to two ends of the heating wire; and a soft insulative protective skin coated on the heating wire and the conductive wire as an outer insulative layer, whereby the heating wire is electrically connected with the metal wire without using any terminal and the outermost insulative layer is integrally coated on surfaces of the heating wire and the conductive metal wire.

5. The aquarium heater as claimed in claim 4, wherein the metal wire is a tin-plated copper wire and the insulative medium is a fiber glass wire.

6. The aquarium heater as claimed in claim 4, wherein the metal wire is a copper wire.

7. The aquarium heater as claimed in claim 4, wherein the insulative medium is a fiber glass.

8. The aquarium heater as claimed in claim 4, wherein the insulative medium has an elongated profile and an extension section, and the metal wire and heating wire are both located on the extension section of the insulative medium.

9. The aquarium heater as claimed in claim 4, wherein the material and length of the heating wire are varied to form different heaters with different specifications to control the temperature of the surface of the aquarium heater to be approximately 62° C.

10. The aquarium heating heater as claimed in claim 4, wherein the outer protective skin is made of soft insulative plastic, whereby the aquarium heater is made in the form of an elongated wire.

11. The aquarium heater as claimed in claim 4, wherein the outer protective skin of the heater comprises a plastic sheet, whereby the aquarium heater is formed as a tile.

12. The aquarium heater as claimed in claim 4, wherein the outer protective skin comprises an irregularly shaped block, whereby the aquarium heater is formed as a rock.

* * * * *